Jan. 15, 1924.

F. ROVETTO

SUBMARINE

Filed Dec. 13, 1922

Inventor
F. Rovetto
By Langner, Perry, Card & Langner
Attys.

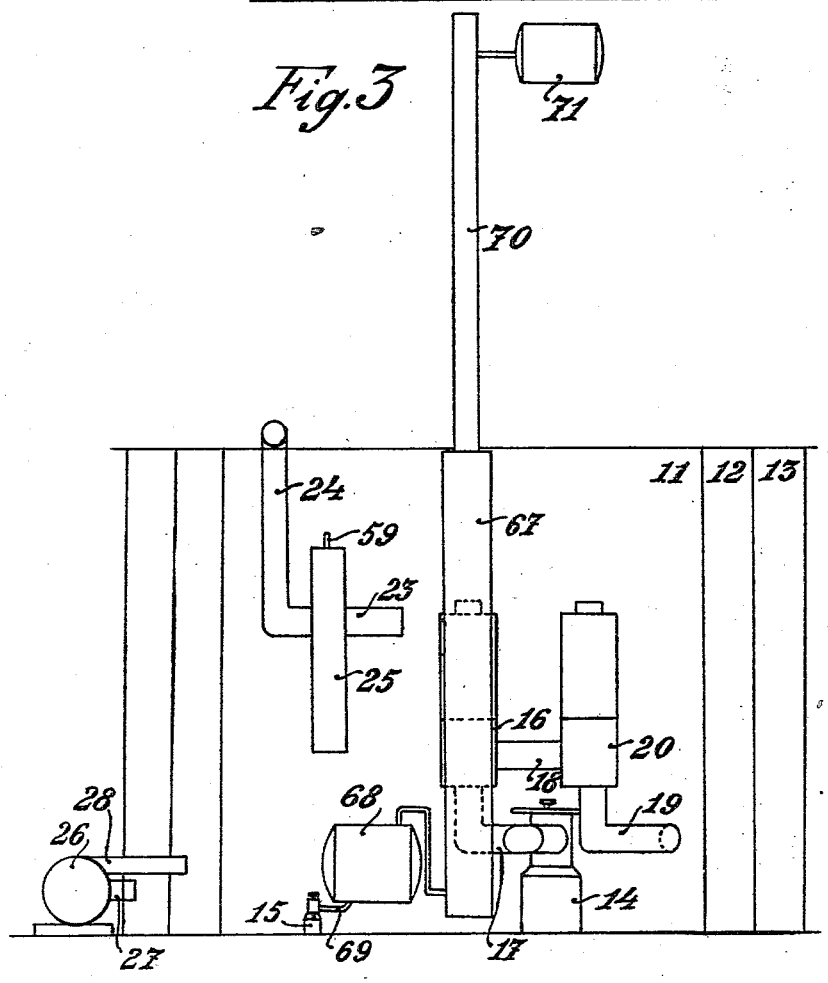

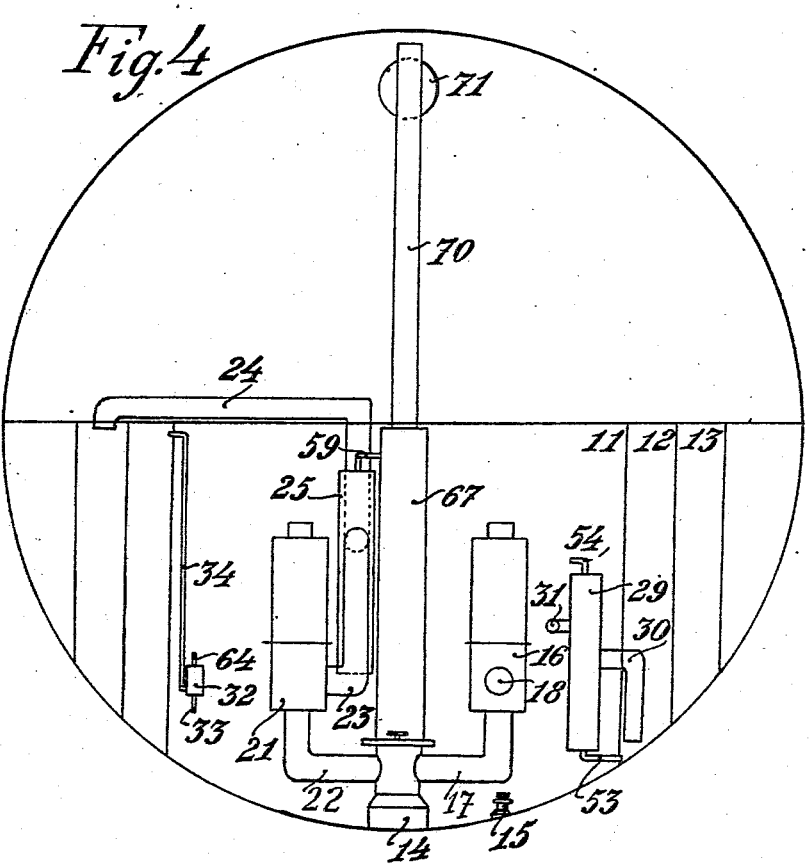

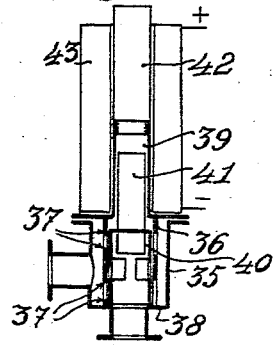
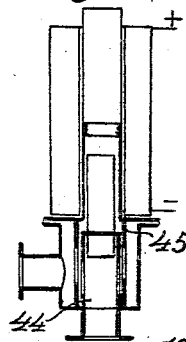
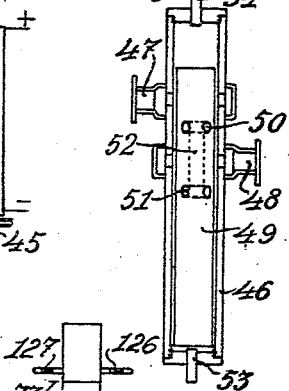
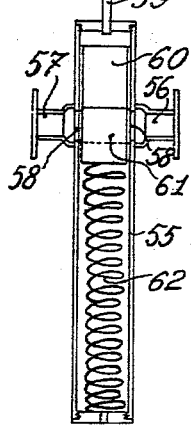
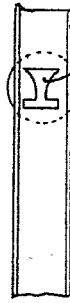
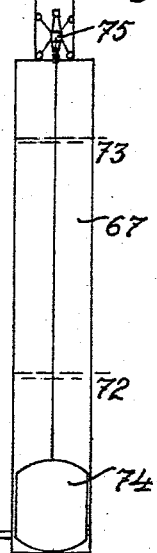
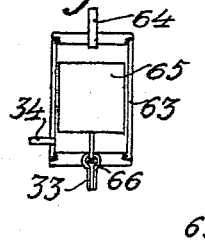

Jan. 15, 1924. 1,481,230
F. ROVETTO
SUBMARINE
Filed Dec. 13, 1922 6 Sheets-Sheet 5
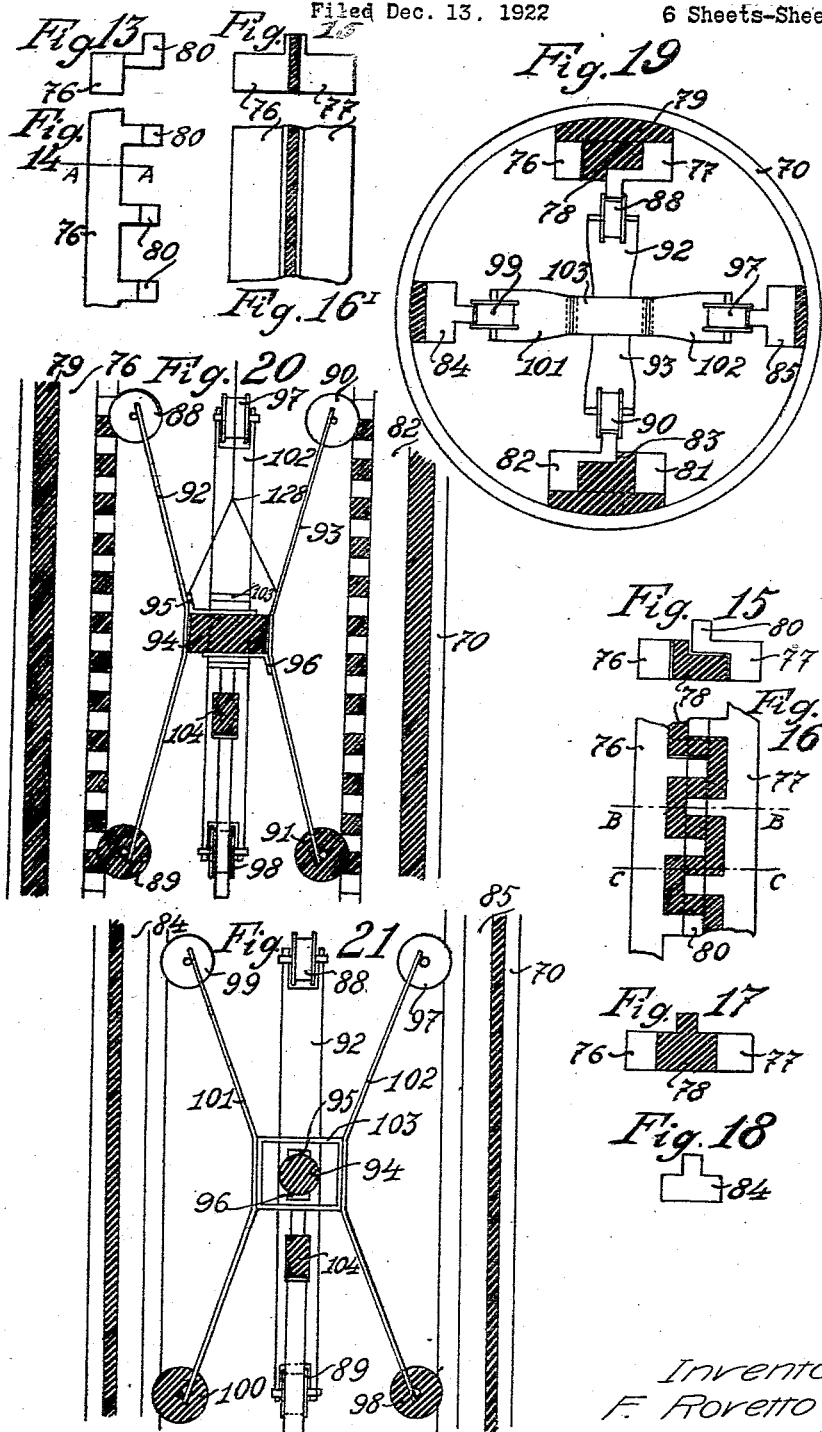
Inventor
F. Rovetto
by Langner, Parry, Card + Langner
Atty's.

Jan. 15, 1924.

F. ROVETTO

SUBMARINE.

Filed Dec. 13, 1922

Inventor
F. Rovetto
by Langner, Parry, Card & Langner
Att'ys.

Patented Jan. 15, 1924.

1,481,230

UNITED STATES PATENT OFFICE.

FRANCESCO ROVETTO, OF SPEZIA, ITALY.

SUBMARINE.

Application filed December 13, 1922. Serial No. 606,670.

*To all whom it may concern:*

Be it known that I, FRANCESCO ROVETTO, a subject of the King of Italy, and residing at the Royal Arsenal, Spezia, Italy, have invented certain new and useful Improvements in Submarines, of which the following is a specification.

The object of the invention is an apparatus for maintaining a submergible submarine automatically in equilibrium between two waters while its driving motors are at rest. The apparatus attains this scope by causing the submarine being submitted to variations of weight in accordance with determinate laws. These variations of weight are obtained automatically through successive admissions of water into, and discharges of water from the submarine. As a consequence of the variations of weight the submarine moves with an oscillatory motion while keeping itself on the same vertical line and moving up and downwards. The successive variations of weight take place in accordance with the following laws:

1. During the downward movement of the submarine the variations of weight are negative (discharge of water) so that the weight of the submarine during the downward movement is continuously decreasing, 2. During the upward movement of the submarine the variations of weight are positive (admission of water) so that the weight of the submarine during the upward movement is continuously increasing, 3. The successive variations of weight during the upward movement between the limits of depth within which the submarine is intended to remain, are of equal value and they take place after the submarine has covered determinate intervals of space, so that the total variations of weight are a function of the spaces covered and in particular they are proportional to the spaces covered in case these intervals of space are equal between them, 4. The successive variations of weight during the downward movement between the limits of depth within which the submarine is intended to remain, are of equal value and take place after the submarine has covered determinate intervals of space, so that the total variations of weight are a function of the spaces covered and in particular they are proportional to the spaces covered in case these intervals of space are equal between them, 5. When the submarine has reached the pre-established maximum or minimum limits of depth, the variations of weight, instead of taking place in proportion to the spaces covered, may take place in proportion to time, so that the downward or upward movement of the submarine is rapidly stopped and the distances by which the submarine may go beyond these limits are reduced to a minimum.

6. In a first period of time the variations of weight during the successive downward movements are of greater value than those which take place during the upward movements, so that the spaces covered by the submarine during the downward movement are smaller than those covered during the upward movement and the submarine, though continuing to oscillate, has a tendency to rise until it reaches the minimum limit of depth, 7. After the submarine has reached this minimum limit of depth a second period begins in which the variations of weight during the successive downward movements are of smaller value than those which take place during the upward movement, so that the submarine, although it continues to oscillate, has a tendency to descend until it reaches the maximum limit of depth. After this a third period begins which is similar to the first period and wherein the variations of weight during the downward movements are of greater value than those which take place during the upward movements, so that the submarine has a tendency to rise, this third period being followed by a fourth period similar to the second period, and then by a fifth period similar again to the first period, and so on.

Figure 1 shows the motion of the submarine as it is generated by variations of weight in accordance with the above cited rules. The axis of the abscissas carries the periods of time, the axis of the ordinates the spaces. The line 1—2 indicates the water level, the line 3—4 the minimum limit of depth $h_1$, the line 5—6 the maximum limit of depth $h_2$.

While oscillations caused through casual variations of weight or of thrust of the submarine on account of the resistance of the water to its motion, are gradually decreasing in width until they take the amplitude of those oscillations which are due to the variations of weight produced as described.

The apparatus according to the invention consists of a controlling device which is highly sensible to the variations of depth of the submarine, and of a second device which is put in motion by the first device.

The working of the controlling device is based on the variations of pressure which take place when the depth varies. The second device generates the variations of weight by allowing successive admissions of water into, and discharges of water out of the submarine. The connection between the first and the second device is resilient.

The arrangement of the apparatus on board the submarine as hereafter described is given by way of example only and in practice it may be widely modified to adapt the apparatus in the simplest way to submarines of any type and construction.

The apparatus will be described with reference to the accompanying drawings, wherein—

Figure 1 is a diagrammatic showing of the motion of a submarine according to this invention.

Figure 2 is a horizontal section along the top part of the rooms of the submarine wherein the apparatus is lodged, Figure 3 is a longitudinal section along line 3—3 of Figure 2, Figure 4 is a cross section on line 4—4 of Figure 2, Figure 5 illustrates the construction of the inlet and outlet valves, Figure 6 shows a valve arranged on the piping from the outlet valve to one of the caissons, Figure 7 is an elevational view of a safety valve, Figure 8 is a view of a valve arranged on the piping from the inlet valve to one of the caissons, Figure 9 shows a detail of this valve, Figure 10 shows another detail, Figure 11 illustrates the inlet valve for the compressed air, Figure 12 is a schematical view of the controlling device for the valves, Figure 13 is a sectional view of a metal contact bar along line A—A of Figure 14, Figure 14 is an elevation of this bar, Figure 15 is a sectional view of a contact unit along line B—B of Figure 16, Figure 16 is an elevation thereof,

Figure 15′ and

Figure 16′ are similar views of a modified form of the contact unit,

Figure 17 is a sectional view along line —C of Figure 16,

Figure 18 is a cross section of another contact unit,

Figure 19 is a horizontal section of the contact members and the cooperating switch, Figure 20 is a vertical section of the same parts, Figure 21 is a vertical section thereof at right angles to Figure 20.

With reference to Figures 2, 3 and 4, 11, 12 and 13 are three concentric cylindrical caissons whose axis passes through the centre of gravity of the submarine. The caisson 11 has lodged in it the various members of the apparatus, the tightly closed caisson 12 serves to contain compressed air and the water which is discharged during the working of the apparatus, the caisson 13 which is in communication with the inside of the submarine, receives the water which enters the submarine during the working of the apparatus.

Figure 1:
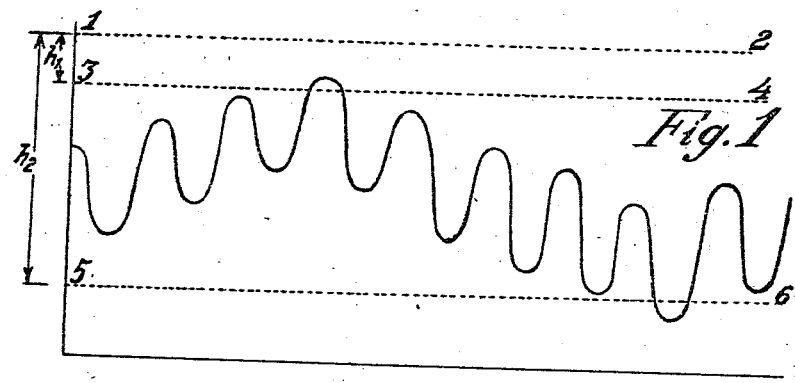
Figure 2:
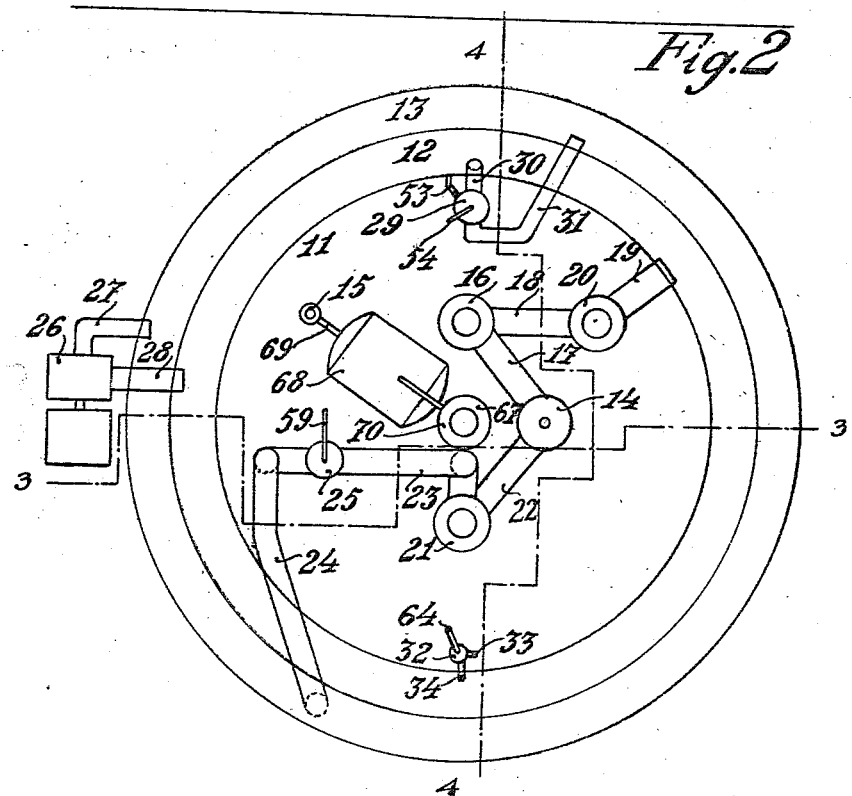

The device which generates the variations of weight comprises, as shown in Figures 2, 3, 4, two ordinary Kingston valves 14, 15 which communicate with the sea and are permanently open during the working of the apparatus. An outlet valve 16 communicates on the one hand by means of the pipe 17 with the Kingston valve 14 and on the other hand through the pipes 18, 19 with the caisson 12, a valve 20 being interposed in this piping. The water which is discharged from the caisson 12 into the sea flows through the pipe 19, the valve 20, the pipe 18, the valve 16, the pipe 17 and the Kingston valve 14.

An inlet valve 21 communicates on the one hand through the pipe 22 with the Kingston valve 14 and on the other hand by means of the pipes 23, 24 and through the valve 25 with the caisson 13. The water which enters the caisson 13 from the sea, flows through the Kingston valve 14, the pipe 22, the valve 21, the pipe 23, the valve 25 and the pipe 24.

A pump 26 which is always in motion during the working of the apparatus, sucks up water from the caisson 13 through the pipe 27 and transports it through the pipe 28 into the caisson 12 so that the air contained therein is compressed. A safety valve 29 serves to maintain unaltered the difference between the pressure of the water in the caisson 12 and the outside pressure of the sea independently of the depth of the submarine. The valve 29 communicaes on the one hand through the pipe 30 with the caisson 12 and on the other hand through the pipe 31 with the caisson 13.

A valve 32 permits compressed air from the compressed air containers of the submarine being admitted into the caisson 12 through the pipes 33, 34 when on account of the speed of the downward motion of the submarine the water supplied by the pump 26 is not sufficient to maintain the required pressure within the caisson 12.

The outlet valve 16 and the inlet valve 21 are of identical construction and they are each controlled by a solenoid. These valves are illustrated in detail in Figure 5 wherein 35 is the valve box which is provided with two nozzles. 36 is the cylinder which has two or more series of circumferential openings 37 and is secured by bolts to the valve box 35, a packing 38 being interposed between the cylinder and the bottom of the valve box, to prevent leakage. From the cover of the valve cylinder is extending upward the pipe 39 which is screw-threaded at its upper end. Within the cylinder 36 is slidably arranged a piston 40 provided on its cylindrical part with circumferential openings which are identical with those of the cylinder. A soft iron piece 41 is connected with the piston, while a second iron piece 42 is screwed onto the upper end of the pipe 39. The pipe 39 and the soft iron piece 42 are surrounded by a solenoid 43.

When electric current is passing through the solenoid 43, the piston 40 is carried upward by the soft iron piece 41 so that its apertures are brought opposite the apertures of the cylinder 36; in this way the valve is made to open. When the passage of current is interrupted the piston falls downward and the valve closes.

The valve 20 which is shown in detail in Figure 6 is controlled by means of a solenoid and serves to adapt the apparatus to the requirements which are set out under rules 6 and 7. During the periods when the submarine must have the tendency to rise the valve 20 remains permanently and completely open, while it remains permanently, but partly open when the submarine must tend to descend. This valve 20 is constructed like the valves 16 and 21. When no current passes through the solenoid the piston 44 is in its lowermost position and only a part of the area of its apertures is opposite the apertures in the cylinder 45. When current passes through the solenoid the piston is caused to rise and its apertures are with their whole area opposite those of the cylinder.

The safety valve 29 shown in detail in Figure 7 has the purpose to prevent variations of the difference between the pressure of the water in the caisson 12 and the outside pressure of the sea, independently of the depth of immersion of the submarine. 46 is the valve cylinder which is closed both at the top and at the bottom by a cover and carries two nozzles 47, 48. In correspondence with each nozzle there are provided circumferential apertures on the cylinder. 49 is the piston which carries two series of circumferential apertures 50, 51 which intercommunicate by means of the channel 52 arranged along the axis of the piston. The lower part of the cylinder communicates through the pipe 53 with the caisson 12, while the upper part communicates through the pipe 54 with the sea through the Kingston valve 15.

The nozzle 48 communicates with the caisson 12 through the pipe 30, while the nozzle 47 communicates with the caisson 13 through the pipe 31. When the pressure of the water in the caisson 12 against the bottom of the piston 49 is larger than the sum of the weight of the piston and the pressure of the water of the sea against the top of the piston the latter is made to rise so as to bring its two series of apertures 50, 51 opposite the apertures provided in the cylinder, whereby the caissons 12 and 13 are put in communication through the nozzles 48, 47. Water then passes from the caisson 12 to the caisson 13 and the pressure in the caisson 12 diminishes until the piston 49 redescends. In this way the valve attains the scope for which it is intended. The constant difference of pressure per unit of surface of the water in the caisson 12 and that of the sea water is evidently equal to the weight of the piston 49 divided by the area of its cross section.

The valve 25 shown in detail in Figures 8, 9 and 10 serves to control the useful width of the apertures through which water from the sea enters the caisson 13 so that the volume of water which flows through these apertures in a unit of time remains constant no matter which is the depth of immersion of the submarine.

55 is the valve cylinder which is closed both at the top and at the bottom by a cover and carries two nozzles 56, 57. Opposite each nozzle there is provided in the cylinder an aperture 58 having the particular shape shown schematically in Figure 9. The nozzle 56 communicates by means of the pipe 23 with the valve 21, while the nozzle 57 communicates through the pipe 24 with the caisson 13. The top part of the cylinder communicates by means of the pipe 59 with the sea through the Kingston valve 15. 60 is the piston of this valve, which said piston has a cross opening 61 (Figure 10) and is supported by the spring 62.

When the depth of immersion of the submarine increases the pressure against the top of the piston grows and the piston descends so as to compress the spring 62. The opening 61 of the piston which was opposite the two oppositely arranged openings 58 in the cylinder, will be brought, when the pressure increases, to move away from these openings so that same will be more and more throttled as the depth of immersion augments. The two apertures 58 are calculated so that the volume of water which flows through the valve 25 remains always the same independently of the depth of the submarine.

The valve 32 which is illustrated in detail in Figure 11 serves to permit the flow of compressed air from the compressed air containers of the submarine into the caisson 12 when the water supplied by the pump 26 is not sufficient to maintain the required pressure in the caisson on account of the speed with which the submarine is moving downward.

63 is the cylinder of this valve which is closed both at the top and at the bottom by a cover. It communicates at the top by means of a pipe 64 and through the Kingston valve 15 with the sea and at the bottom through the pipe 34 with the caisson 12 and through the pipe 33 with the compressed air containers of the submarine. Inside the cylinder is arranged a vertically slidable piston 65. When the pressure against the bottom face of the piston, which is equal to the pressure prevailing in the caisson 12, is greater than the pressure of the water of the sea against the top of the piston increased by the weight of this said piston, the latter rises and closes the valve 66 which is carried along by a rod connected with the piston. When on the other hand the pressure in the caisson 12 is below the required pressure as the water supplied by the pump is not sufficient on account of the speed of the downward movement of the submarine, the piston 65 moves downward and opens the valve 66 so that compressed air flows from the containers on the submarine into the caisson 12.

The weight of the piston 65 is such that the valve 66 opens when the difference between the pressure in the caisson 12 and that of the sea is below a certain minimum value.

The device which causes the valves 16, 20, 21 to operate at the required moment and which permits the passage of electric current through these valves is shown schematically in Figure 12. This device consists of a pipe 67 which communicates at the bottom with a container 68 which in turn communicates with the sea through the pipe 69 and the Kingston valve 15. Above the pipe 67 is arranged a second pipe 70 which communicates with a container 71. With the exception of the opening towards the sea the whole arrangement of the pipes 67, 70 and of the containers 68, 71 is tightly closed.

When the submarine is submerged and the Kingston valve 15 is open, water from the sea enters the container 68 and a part of the pipe 67 so as to compress the air contained in the controlling device. The volumes of the containers 68, 71 and of the pipes 67, 70 are such that the container 68 is full of water when the submarine is completely under water with the exception of the top of the periscope, while the water level in the pipe 67 is at the line 72 when the submarine is at the minimum limit of the depth of equilibrium, and the water level is at the line 73 when the submarine is at the maximum limit of depth of equilibrium. When the water level in the pipe rises or descends a float 74 will rise or descend and will draw along with it by aid of a rod an electric switch 75 which moves within the pipe 70 and is adapted to engage contacts within this pipe and thus to permit at the required moment a passage of electric current through the solenoids which control the valves 16, 20, 21. The lines 72, 73 of the water level in the pipe 67 correspond with two positions $72^I$, $73^I$ of the switch 75 in the pipe 70.

The electric contacts are shown in Figures 13–23 wherein the parts made of ebonite are shown by cross lines. These electric contacts are arranged inside the pipe 70 along the generatrices displaced by 90° one from the other (Fig. 19).

Along one generatrix are arranged the two series of contacts 76, 77 which are insulated one from the other by means of an ebonite bar 78 and from the pipe 70 by means of an ebonite bar 79. Both the series of contacts 76 and the series of contacts 77 are formed of a metal bar having the same length as the pipe 70 and carrying projections 80. Figures 13 and 14 show respectively the profile and the elevation of these parts, Figure 13 being a sectional view along the line A—A of Figure 14. The two series of contacts 76, 77 and the ebonite bars 78 are combined in the manner shown in Figures 15, 16 and 17, Figures 15 and 17 being respectively cross sections along lines B—B and C—C of Figure 16.

Along the generatrix opposite the one now described there are arranged two other series of contacts 81, 82 (Figure 19) which are insulated one from the other by an ebonite bar 83 and are identical with the contact series 76, 77 and the ebonite bar 78.

In case it is desired that beyond the limits of depth of equilibrium the variations of weight of the submarine should be proportional to the periods of time instead of being a function of the spaces, the bars 76, 77, 81 and 82 above the line $73^I$ and below the line $72^I$ (Figure 12) may have the shape and be combined as shown in section and in elevation in Figures 15' and 16'. In this case the projections 80 are abolished and the two bars present an uninterrupted surface towards the inside of the tube 70.

Figure 22:
Figure 22 shows a modified form of the pipe 67.

If it is desired that the variations of weight within the limits of depth of equilibrium be proportional to the spaces covered it is necessary that the interval between the successive contacts of the series 76, 77, 81, 82 should not have a constant value, but they must have a decreasing width on their approach towards the top. The same purpose may be obtained and the width of the interval between the contacts may remain unaltered when using a pipe 67 which is not cylindrical as shown in Figure 12, but has cross sections of decreasing area towards the top with a profile as shown in Figure 22. The formula which gives the values of the area of these sections as a function of their position in the pipe may easily be found through calculations.

Along a generatrix which is displaced by 90° respecting the above described contacts there is arranged a contact 84 which consists of a metal bar having the cross section shown in Figure 18 and having the same length as the pipe 70 from which it is insulated.

Figure 23:
Figure 23 is an elevation of one of the contact units.

Opposite the contact 84 there is provided a metal bar 85 which has also the cross section shown in Figure 18 and has the same length as the pipe 70 from which it is insulated. The bar 85 is interrupted at two points to lodge the contacts 86, 87 which are insulated therefrom (Fig. 23).

The switch is shown in Figures 19, 20 and 21 and it comprises four rollers 88, 89, 90 and 91. The rollers 88 and 89 are interconnected by the plate spring 92, the rollers 90, 91 by the plate spring 93. The two springs are held together by an ebonite piece 94. The spring 92 has secured to it the electric contact 95 which rests on the top face of the ebonite piece 94, while the spring 93 carries an electric contact 96 which bears against the lower face of the ebonite piece 94. The two rollers 88, 90 are made of metal, the two rollers 89, 91 of ebonite. The four rollers are guided by the contacts 80 of the series of contacts 76, 77 and 81, 82.

The combination of the rollers, the springs and the ebonite piece 94 is prevented from descending through it being held in an indifferent equilibrium by a counterweight secured to the wire 128 connected with the springs 92, 93 (Figure 20).

The switch comprises further four rollers 97, 98, 99 and 100 which are connected in pairs by the plate springs 101 and 102 secured to a metal ring 103 which is connected by means of the ebonite piece 104 with the rod of the float 74. The four rollers are guided by the bar 85 and by the contact member 84. The two rollers 97, 99 are made of metal, while the rollers 98, 100 are of ebonite.

The working of the device is as follows:

When the submarine is gradually submerging and the float 74 in the pipe 67 moves upwards, the ring 103 will engage with its bottom face the contact 96 and carry it upwards together with the ebonite piece 94 and with the springs and the rollers connected thereto. During this upward movement of the switch the contacts 80 of the series 81, 82 are alternately engaged by the roller 90 and the contact member 84 is thus alternately connected with the contact series 81, 82.

When on the other hand the submarine rises and the float 74 descends, the ring 103 will engage with its top face the contact 95 and the contacts 80 of the series 76, 77 will be alternately engaged by the roller 88, so that during this movement the contact member 84 will be alternately connected with the contact series 76, 77.

When the water level in the pipe 67 is at the line 72 (Figure 12) and the submarine therefore has reached the minimum limit of depth of equilibrium the roller 97 engages the contact 87 and in this way connection is set up between this contact and the contact 84.

When the water level in the pipe 67 is at the line 73 and the submarine therefore has reached the maximum limit of depth of equilibrium the roller 97 engages the contact 86 and connection is thus set up between this contact and the contact 84.

As it is not convenient to have the switch traversed by the current of rather high intensity which passes through the solenoids of the valves 16, 20, 21, five auxiliary electromagnets are made use of which also serve the purpose of holding the valves 16, 21 open for a constant period of time for each aperture.

Figure 24:
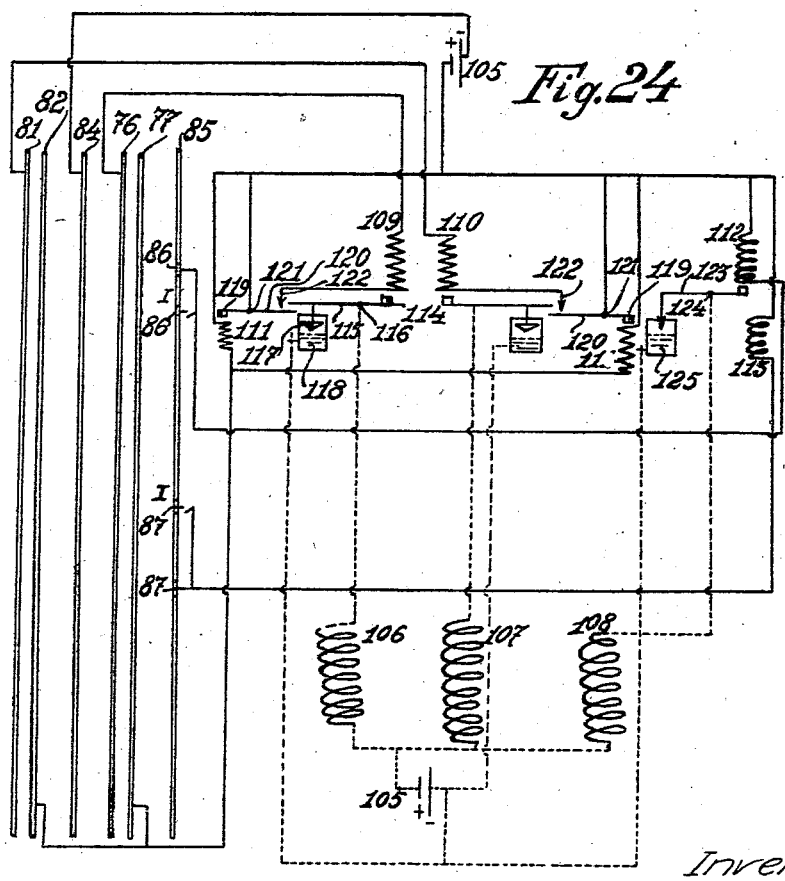
Figure 24 is a scheme of the electric connections.

A scheme of the electric connections for the controlling device is shown in Figure 24 wherein the series of contacts 76, 77, 81 and 82, the contacts 84 and the bar 85 are shown laid out in one single plane.

In this figure 105 is the current generator and 106, 107, 108 are the solenoids which control respectively the inlet valve 21, the outlet valve 16 and the valve 20. 109 is the auxiliary electromagnet of the solenoid 106 and thus of the valve 21. 110 is the auxiliary electromagnet of the solenoid 107 and therefore of the valve 16. The auxiliary electromagnet 111 which in the figure appears twice, serves for the control of the solenoids 106, 107 and thus of the valves 21 and 16 in the manner hereafter described. 112, 113 are the auxiliary electromagnets of the solenoid 108 and thus of the valve 20.

When current is passing through the electromagnet 109 the latter attracts its armature 114 so as to cause the lever 115 to rotate about its fulcrum 116, whereby the funnel-shaped member 117 is immersed into the mercury contained in the glass 118. When the passage of current through the electromagnet 109 is interrupted the armature 114 falls back and the funnel 117 rises out of the mercury, while the passage of current through the solenoid 106 however is not immediately interrupted, but continues until all the mercury which had entered the funnel has left same through a small hole provided in its lower vertex. When current is passing through the electromagnet 111, the latter attracts its armature 119 so as to cause the lever 120 to rotate about its fulcrum 121, the end of this lever engaging the contact 122 so as to connect the electromagnet 109 with the positive pole of the current generator. When current is passing through the electromagnet 109 and its armature is about to engage the poles, the end of the lever 115 strikes against the end of the lever 120 so as to disengage it from the contact 122. In this way the passage of current through the electromagnet 109 is interrupted, the funnel 117 rises and current continues to pass, as above said, through the solenoid 106 for a determinate period of time until all the mercury has left the funnel. In this way, the successive apertures of the valve 21 controlled by the solenoid 106 are caused to have equal duration.

The same events take place for the electromagnet 110 which controls the solenoid 107 and therefore the valve 16.

When current is passing through the electromagnet 112, the lever 123 is caused to rotate about its fulcrum 124 and its downward bent end enters the mercury contained in the glass 125 so as to permit the passage of current through the solenoid 108 which causes the piston of the valve 20 to rise, this valve being thus caused to open completely. As the lever 123 is in an indifferent equilibrium its end continues to be immersed in the mercury and therefore current continues to pass into the solenoid 108 also when the current is no longer passing through the electromagnet 112. When current is passing through the electromagnet 113, the lever 123 rotates in the opposite direction, its end is no longer immersed in the mercury, the passage of current through the solenoid 108 is interrupted and the piston of the valve 20 falls back so that this valve remains only partly open.

In Figure 24 the full lines show the circuit of the auxilary electromagnets and the dotted lines the circuits of the solenoids 106, 107 and 108.

The circuits of the auxiliary electromagnets work as follows.

As regards the electromagnet 111 it is evident from Figure 24 that when the switch during its upward movement engages through its roller 90 the contacts of the series 82 or during its downward movement through its roller 88 the contacts of the series 77, electric current passes through the electromagnet 111, the series 82 or the series 77, the switch and the contact 84 to the negative pole.

As regards the electromagnet 109, the current passes through the lever 120 controlled by the electromagnet 111, through the contact 122 and the electromagnet 109 and flows to the contact series 76. When the submarine rises and the switch therefore descends, the contact series 76 is put in communication with the contact 84 each time the roller 88 of the switch engages one of the contacts of the series 76. The current passes then through the electromagnet 109. But as soon as the end of the lever 115 goes downward and removes the end of the lever 120 from the contact 122, the passage of current through the electromagnet 109 is interrupted. As the switch continues its downward movement it engages with its roller 88 the successive contact belonging to the series 77 and communication between the lever 120 and the contact 122 is reestablished, so that when the roller 88 has engaged the successive contact of the series 76 current flows again through the electromagnet 109.

In this way the purpose is attained that the value 21 is caused to open after the submarine has covered determinate intervals of space, and that it is held open for a constant period of time at each aperture. The action of the valve 25 which throttles the inlet openings in accordance with the depth of immersion of the submarine while securing for any depth the flow of a constant volume of water through this valve, and the fact that the duration of each aperture of the valve 21 is constant, have the result that the quantity of water which enters the submarine at each aperture of this valve is constant.

The description regarding the electromagnet 109 applies also to the electromagnet 110 which controls the solenoid 107 and therefore the outlet valve 16. It will thus be evident that at each aperture of the valve 16 the quantity of water that is discharged from the submarine is constant and equal to a maximum value for all the apertures that take place during the periods when the submarine tends to rise, and it is constant and equal to a minimum value for all the apertures which take place during the periods wherein the submarine has the tendency to descend.

In fact, for any depth of immersion of the submarine the difference of pressure between the inside of the caisson 12 and the outside is constant and for this reason the speed of the flow of the water through the valve 20 remains constant; further, the duration of the aperture of the valve 16 is constant for all the apertures on account of the use of the funnel-shaped contact member which enters the mercury.

As regards the electromagnets 113, 112, the electric current passes through the electromagnet 113 only when the roller 97 of the switch engages the contact 87 and puts in communication this contact, and therefore the electromagnet 113, with the contact 84 and thus with the negative pole. The current passes instead through the electromagnet 112 only when the roller 97 of the switch engages the contact 86. The two electromagnets control by aid of the solenoid 108 the valve 20 in the manner above set out.

In the place of the electromagnets 109, 110, 111, 112 and 113 small solenoids might be used within the scope of the invention.

The circuits of the solenoids 106, 107 and 108 are shown in the Figure 24 and it is thought that no further explanation is required.

In case beyond the limits of depth of equilibrium the variations of weight must be proportional to the periods of time and not to the spaces and the series of contacts 76, 77, 81, 82 below line $72^I$ and above line $73^I$ (Figure 12) are therefore constructed as shown in Figures 15′ and 16′, the passage of current through the solenoid 106 when the submarine is rising, and through the solenoid 107 when the submarine is descending, takes place without interruptions and the valves controlled thereby remain always open.

The limits of the depth of equilibrium $h_1$, $h_2$ may be altered at will in the following way. When introducing into the pipe 70 (Figure 12) through the valve 126 compressed air taken from the compressed air containers of the submarine, and when thus causing the quantity of air contained in the controlling device being increased, the limits of depth $h_1$, $h_2$ will be augmented. When discharging on the other hand through the valve 127 a part of the air contained in the controlling device, the limits of depth will be diminished.

Another way of varying the limits of depth of equilibrium might be that of employing besides the contacts 86, 87 (Figure 24) along the guide 85 other contacts $86^I$, $87^I$ which may be inserted at will in the circuit of the electromagnets 112, 113 while the contacts 86, 87 are cut out.

It is evident that the constructional details of the apparatus as above described may be varied within the scope of the invention and within the limits of the claims hereunto annexed.

What I claim is:

1. A method for maintaining a submarine in equilibrium between two water levels, while the driving motors are stopped, comprising causing admissions of water into the submarine as soon as the latter commences to rise and continuing during the entire space covered during upward motion, and causing discharges of water from the submarine as soon as it commences to descend and continuing during the entire space covered during downward motion, the quantity of the water that enters and the quantity of water that leaves the submarine, being, in their totality, a function of the spaces covered during upward and downward motions.

2. An apparatus for maintaining a submarine in equilibrium between two water levels, while the driving motors are stopped, comprising, a controlling device, including a pipe which communicates with the sea, a float therein which is caused to move, directly through the action of the water of the sea said float carrying an electric switch, admission and outlet valves, solenoids for controlling the valves, said switch permitting electric current to pass at intervals through said solenoids for opening said valves in proportion to the space covered by the float and thus by the submarine.

3. An apparatus according to claim 2, there being a plurality of contacts provided in the said pipe of the controlling device, said contacts controlling a magnetic valve arranged on outlet piping, whereby to increase the opening of such valve when the submarine tends to reach the upper limit of the depth of equilibrium, and to reduce such opening when the submarine tends to reach the lower limit of the depth of equilibrium.

4. An apparatus according to claim 2, comprising, in combination, a water pump, a caisson, and a return valve for maintaining a pressure in the caisson which exceeds by a constant value, the outer pressure, irrespective of the depth of immersion of the submarine.

5. An apparatus according to claim 3, comprising, in combination, a water pump, a caisson, and a return valve for maintaining a pressure in the caisson which exceeds by a constant value, the outer pressure, irrespective of the depth of immersion of the submarine.

6. An apparatus according to claim 2, comprising, in combination, means for controlling admission of air into and discharge of air from, the pipe of the controlling device, whereby to vary the limits of the depth of equilibrium.

7. An apparatus according to claim 3, comprising, in combination, means for controlling admission of air into and discharge of air from, the pipe of the controlling device, whereby to vary the limits of the depth of equilibrium.

8. An apparatus according to claim 4, comprising, in combination, means for controlling admission of air into and discharge of air from, the pipe of the controlling device, whereby to vary the limits of the depth of equilibrium.

9. An apparatus according to claim 5, comprising, in combination, means for controlling admission of air into and discharge of air from, the pipe of the controlling device, whereby to vary the limits of the depth of equilibrium.

In testimony whereof I have signed at Genoa, Italy, this 27th day of November, 1922, in the presence of two subscribing witnesses.

FRANCESCO ROVETTO.

Witnesses:
 RICARDO DELGADO,
 GIOVANNI SEROLO.